United States Patent [19]
Courts et al.

[11] Patent Number: 5,636,360
[45] Date of Patent: Jun. 3, 1997

[54] METHOD FOR PREVENTING OVERWRITING CACHE BUFFER TRANSACTION ENTRIES UNTIL CORRESPONDING LOG BUFFER ENTRIES HAVE BEEN COPIED TO LOG PARTITION OF THE DISK

[75] Inventors: Howard R. Courts; George B. Keith, both of Austin, Tex.

[73] Assignee: Texas Instruments Incorporated, Dallas, Tex.

[21] Appl. No.: 483,026

[22] Filed: Jun. 7, 1995

Related U.S. Application Data

[63] Continuation of Ser. No. 676,397, Mar. 28, 1991, abandoned.

[51] Int. Cl.⁶ ................................................. G06F 15/20
[52] U.S. Cl. ...................... 395/472; 395/427; 395/489; 395/726; 395/182.13
[58] Field of Search ............................... 395/575, 600, 395/483, 427, 472, 489, 726, 182.13

[56] References Cited

U.S. PATENT DOCUMENTS

| | | |
|---|---|---|
| 4,507,751 | 3/1985 | Gawlick et al. ............... 395/600 |
| 4,819,159 | 4/1989 | Shipley et al. ............... 395/575 |
| 4,907,167 | 3/1990 | Skeirik ........................ 395/600 |
| 5,414,840 | 5/1995 | Rengarajan et al. ......... 395/600 |

*Primary Examiner*—Thomas C. Lee
*Assistant Examiner*—Sang Y. Nahm
*Attorney, Agent, or Firm*—W. Daniel Swayze, Jr.; W. James Brady, III; Richard L. Donaldson

[57] ABSTRACT

A method for logging transactions which alters a file system stored on a secondary storage device is disclosed. The method includes the steps of writing data to a buffer in a buffer cache and logging the transaction in a log buffer residing on a primary storage device. A flag is set for the modified buffer, which is then added to a list of modified buffers. As the log buffer becomes substantially full, its contents are copied to a log partition residing on the secondary storage device. After an abnormal system shutdown, the contents of the log partition are copied to the buffer cache in order to restore the disk filing system.

13 Claims, 5 Drawing Sheets

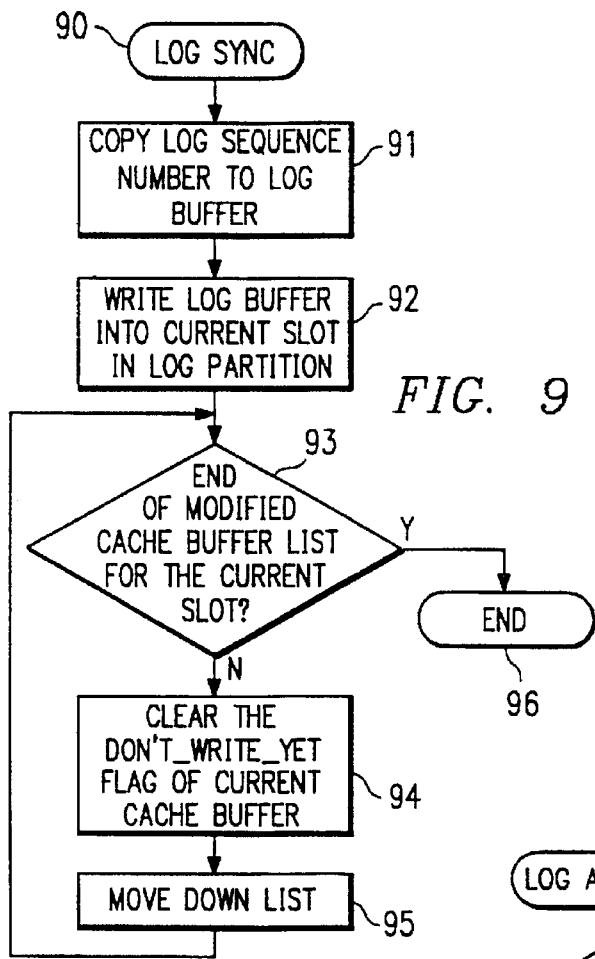

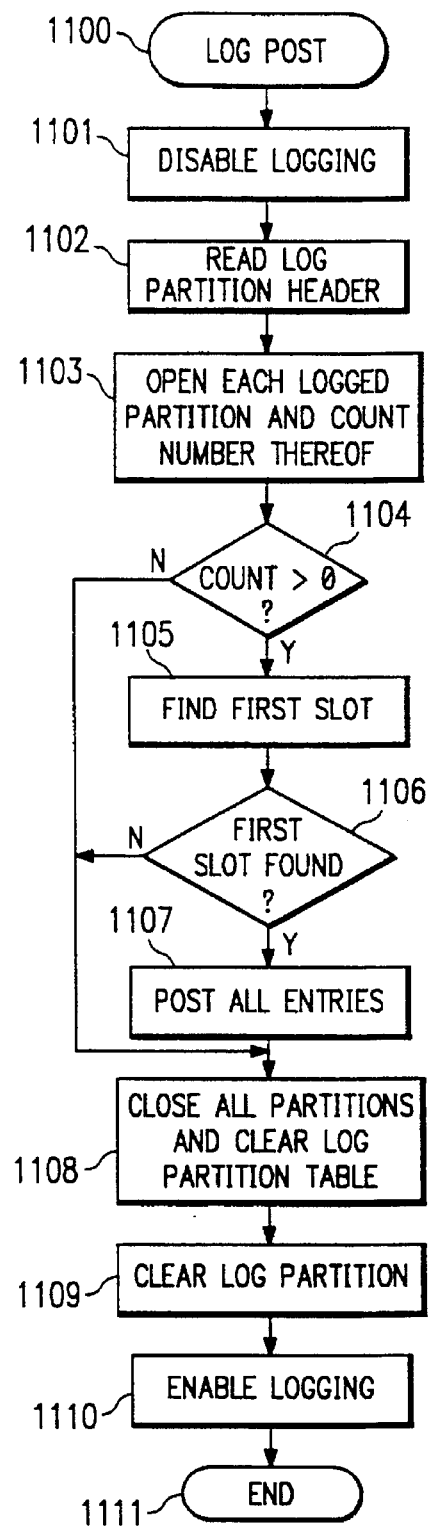
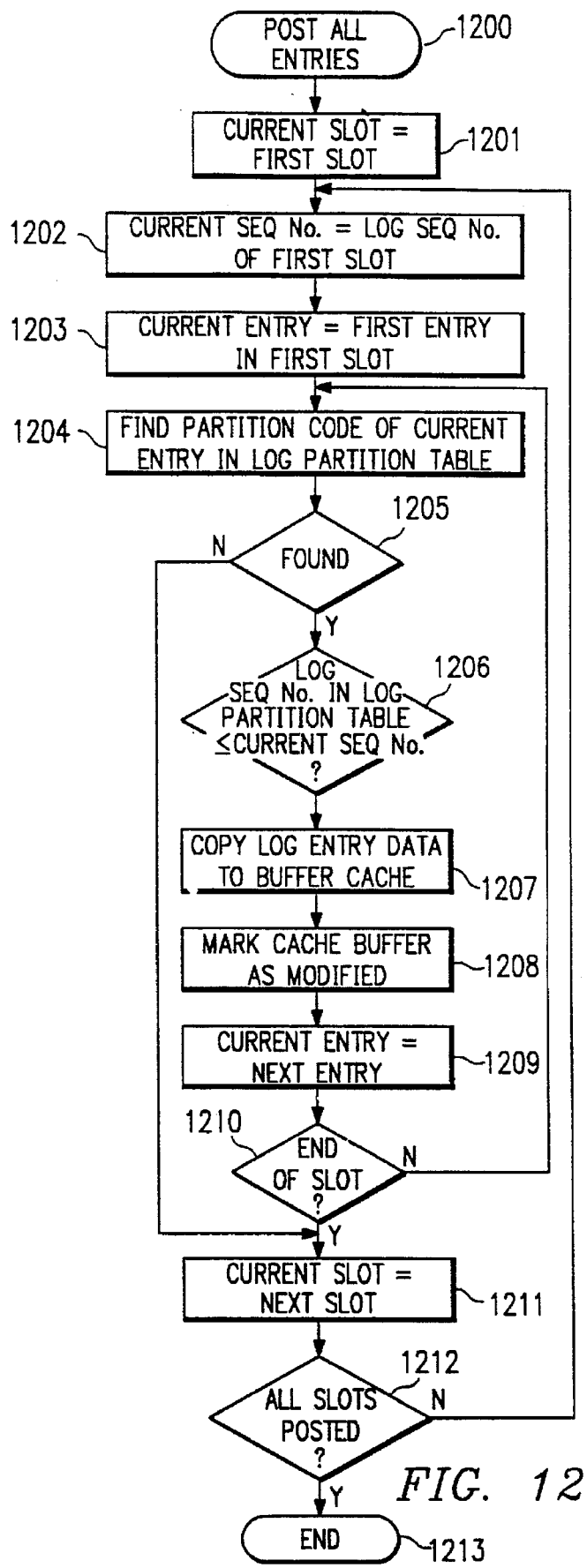
FIG. 11
FIG. 12

3,636,360

METHOD FOR PREVENTING OVERWRITING CACHE BUFFER TRANSACTION ENTRIES UNTIL CORRESPONDING LOG BUFFER ENTRIES HAVE BEEN COPIED TO LOG PARTITION OF THE DISK

This is a Continuation of application Ser. No. 07/676,397, filed Mar. 28, 1991, now abandoned.

TECHNICAL FIELD OF THE INVENTION

This invention relates in general to the field of computer systems. More particularly, the present invention relates to a disk file system logging system and method.

BACKGROUND OF THE INVENTION

The file system of many computer operating systems, such as the UNIX operating system, uses a disk buffer cache to improve the performance of hard disk access functions. The disk buffer cache scheme allows faster access of hard disk data by caching or storing some of the disk data in RAM (random access memory). In this manner, data access time is decreased whenever a piece of needed data can be acquired by accessing RAM instead of the hard disk. However, the use of the buffer cache makes the file system prone to data inconsistency in the event of abnormal system shutdowns.

A modification made to data in a file system typically occurs as a sequence of changes to individual blocks on the disk. Such a modification is generally termed a transaction, which may be defined as an operation that takes the file system from one consistent state to another consistent state. Therefore, the sequence of changes in a transaction may be vital in maintaining the atomicity of the transaction, so that the individual changes within the transaction are seemingly indivisible and instantaneous.

In the cache buffer scheme, disk data that were modified are written to disk only when they are forced out of the cache on a least recently used basis or another similar method. Therefore, the sequence of changes to the disk is usually, and almost always, different than the sequence in which the data were modified. For example, if the transaction has 3 steps, change in step 3 that is dependent on step 2 could be written to disk while the change in step 2 remains in the cache. In the event of an abnormal system shutdown, the change to disk data in step 2 would be lost, yet the change in step 3 would be saved. This causes the disk to be left in an inconsistent state.

One solution to this problem is to periodically write all of the modified data contained in the cache buffers to disk. However, this solution only mitigates the amount of damage, but does not eliminate the problem. Additionally, users of the system may encounter momentary loss of response from the system during the write operations. The UNIX operating system attempts to resolve the problem by using this periodic-write scheme.

Another solution is to restore the sequence of modifications of blocks by operating the cache as a "write through" cache and strictly maintaining the order of the block modifications. Although ensuring the integrity of the disk, this solution has adverse impact on performance because it removes all the advantages of using a cache to delay disk writes. Therefore, this method is used only to protect the most sensitive data.

Therefore, it is desirable to protect the integrity of the file system and yet not substantially hinder the benefits of the buffer cache. The present invention provides a logging apparatus and method for disk file systems.

SUMMARY OF THE INVENTION

In accordance with the present invention, a disk file system logging system and method are provided which substantially eliminate or reduce disadvantages and problems associated with prior systems using a buffer cache scheme.

In one aspect of the present invention, a file system transaction logging method is presented. The buffer cache is accessed for performing the transactions, and the transaction is recorded in a log buffer. The contents of the log buffer, which is located in a primary storage device, such as a RAM, is copied to a log partition, which resides on a secondary storage device such as a hard disk.

In another aspect of the present invention, a file system logging system for a computer using a buffer cache scheme is provided. The system comprises a log buffer residing in a primary storage device and a log partition residing in a secondary storage device. Means for accessing the buffer cache performs the transaction and logging means records it in the log buffer accordingly. Furthermore, the contents of the log buffer is emptied into the log partition as it nears full. After an abnormal system shutdown, the contents of log partition are copied to the buffer cache in the same sequence as the transactions are logged.

In yet another aspect of the present invention, a method for logging a transaction which alters a file system stored on a secondary storage device is disclosed. The method includes the steps of writing data to a buffer in a buffer cache and logging the transaction in a log buffer residing on a primary storage device. A flag is set for the modified buffer, which is then added to a list of modified buffers. As the log buffer becomes substantially full, its contents are copied to a log partition residing on the secondary storage device. After an abnormal system shutdown, the contents of log partition are copied to the buffer cache in the same sequence as the transactions are logged.

The important technical advantage of the present invention allows those systems which use a buffer cache scheme to speed up disk file system access to retain the speed advantage while ensuring the consistency and integrity of the file system.

BRIEF DESCRIPTION OF THE DRAWINGS

For a better understanding of the present invention, reference may be made to the accompanying drawings, in which:

FIG. 9 is a flowchart of the LOG SYNC function of the preferred embodiment of the present invention;

FIG. 10 is a flowchart of the LOG ADVANCE function of the preferred embodiment of the present invention;

FIG. 11 is a flowchart of the LOG POST function of the preferred embodiment of the present invention; and FIG. 12 is a flowchart of the POST ALL ENTRIES function of the preferred embodiment of the present invention.

DETAILED DESCRIPTION OF THE INVENTION

Figure 1:
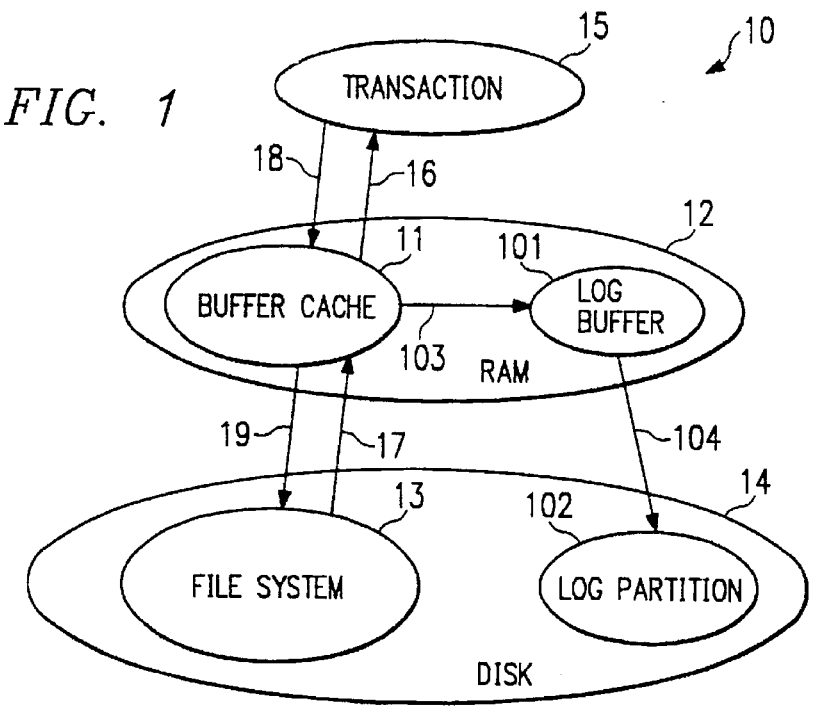
FIG. 1 is a top level diagram of an embodiment of the present invention.

With reference to the drawings, FIG. 1 shows a computer system 10 which has a buffer cache 11 located in a RAM (random access memory) 12 and a file system 13 stored on a mass storage device such as a hard disk 14. Buffer cache 11 maintains a copy of file system data according to some basis of determination. In general, buffer cache 11 contains those data most recently used by the execution of some transactions in computer 10. Therefore, if a transaction 15 desires a piece of data, it first looks for it in buffer cache 11. If the data is found in buffer cache 11 (a hit), then the data is supplied to transaction 15 via path 16 from buffer cache 11. In this manner data is obtained from RAM, which is a more time-efficient data storage device than disk 14. However, if buffer cache 11 does not contain a copy of the desired data (a miss), file system 13 is accessed, as shown by path 17. A copy of the desired data is then made in buffer cache 11, and subsequently supplied to transaction 15. Similarly, when transaction 15 desires to write a piece of data to disk 14, the data is first written into buffer cache 11, as shown by path 18. The data is not written to disk 14 until it has become the least recently used data, for example, and the buffer housing the data is needed to accommodate some other piece of data which is most recently used. The flushed data is then written to the appropriate file in file system 13, as shown by path 19.

As discussed previously, the use of buffer cache 11 destroys the sequence of writes to disk 14 because of the inherent delayed-write property of a buffer cache. The present invention provides a solution to preserve the sequence and yet not substantially cancel the time efficiency quality derived from using a buffer cache.

Continuing to refer to FIG. 1, an overview of the disk file system logging system and method is shown. Logging is accomplished by using two main logging structures, log buffer 101 and log partition 102, which reside in RAM 12 and on disk 14, respectively. Log buffer 101 may also reside in a non-volatile RAM in an alternate implementation. For reasons obvious to a person skilled in the art, only transactions which consist of writing to disk are at issue in the buffer cache scheme and will be discussed below. As transaction 15 writes data to buffer cache 11, a copy of the data is also recorded in log buffer 101, as shown by path 103. The data are recorded sequentially therein along with enough information that if a crash occurs, the data can be restored to disk 14. However, because log buffer 101 is located in RAM 12, its content is still subject to loss in an abnormal shutdown. Therefore, the contents of log buffer 101 are copied to log partition 102 whenever log buffer 101 is substantially full along path 104.

Figure 2:
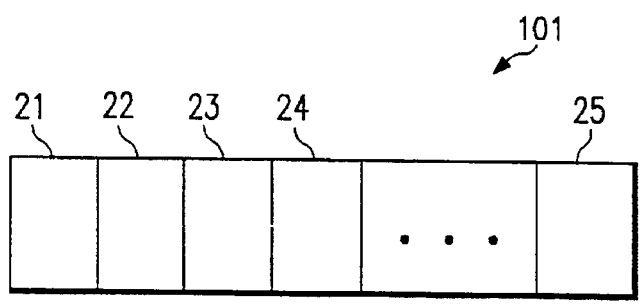
FIG. 2 is a more detailed diagram showing the various components of a log buffer constructed in accordance with a preferred embodiment of the present invention.

Referring to FIG. 2, a more detailed diagram of a preferred embodiment of log buffer 101 is shown. Log buffer 101 is a buffer maintained in RAM 12 and divided into a predetermined number of blocks 21–25. The number of blocks 21–25 is system dependent, and may be determined experimentally. Blocks 21–25 are of equal size. Because each transaction may access more than one block of data, logging of multiple blocks of data may be required for each transaction. The group of blocks logged for a single transaction is termed a log entry. Log buffer 101 may contain multiple log entries, but the length of a log entry may not exceed the length of log buffer 101.

Figure 3:
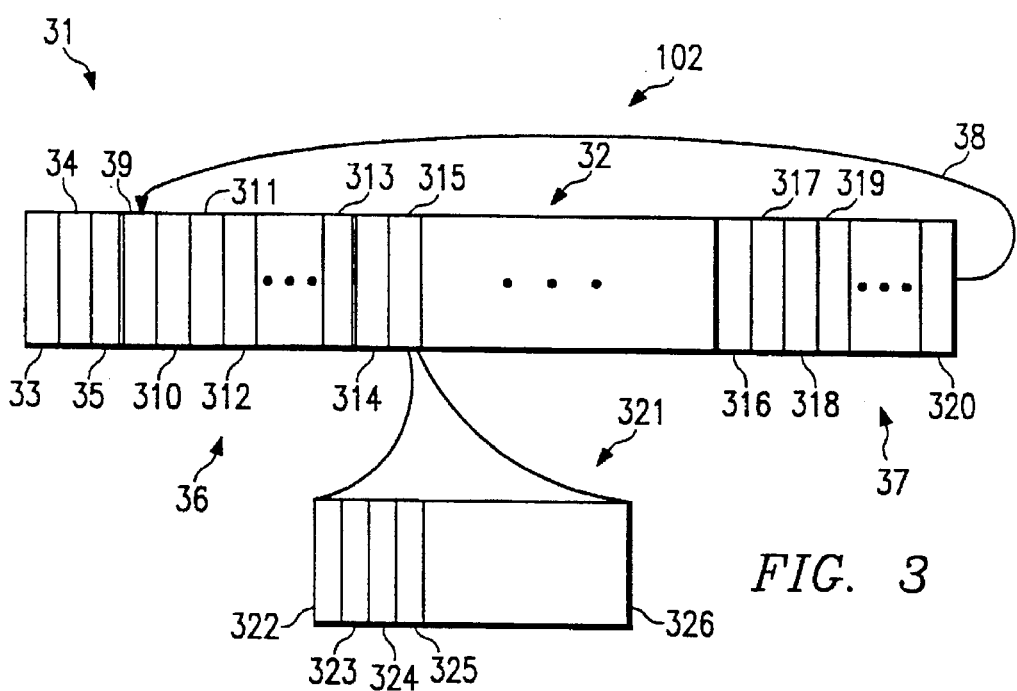
FIG. 3 is a more detailed diagram showing the various components of a log partition constructed in accordance with the preferred embodiment of the present invention.

Referring to FIG. 3, a more detailed diagram of a preferred embodiment of log partition 102 is shown. Log partition 102 includes a header 31 and a circular predefined buffer 32. Log partition header 31 is divided into a number of fields 33–35 containing logging information. Circular buffer 32 is divided into a predetermined number of slots 36–37. Field 33 in header 31 may include, for example, the number of slots 36–37 that circular buffer 32 contain, and field 34 may record the size of slots 36–37, which are of equal size. Additionally, field 35 in header 31 may contain the number of device table entries. Each device number represents a mass storage device currently in use. In a running computer system, there is only one active log partition 102, which logs disk data modifications for all mounted disks. Information also included in log partition header 31 is a log partition table (not shown) which provides a catalog of partition codes of those partitions that are logged. Included in the log partition table are also log sequence numbers of each logged partition. The log sequence numbers are generated preferably by a counter (not shown) having a width such that the count therein cannot conceivably repeat during system operations. For example, a counter of 32-bit width satisfies this requirement. The log sequence numbers are assigned to each partition as it is opened or mounted. The count generated by the counter is copied into the log partition table at this time. The log sequence number is used to restore the file system after an abnormal shut down, as discussed below.

Each log partition slot 36–37 is of the same size as log buffer 101. Therefore, each slot 36 and 37 is divided into the same number of blocks as log buffer 101 (blocks 39–313 and 316–320, respectively). A log slot 36–37 may contain one or more log records (not shown), each record containing logged data for a particular mass storage device, which may be one log entry long or more. Each log record consists of a log record number, length of the record, one or more log entry, and the record number again. The record number at the beginning and end of each log record serves to demarcate the boundaries thereof for verifying whether the entire log record has been transferred to disk 14.

Figure 4:
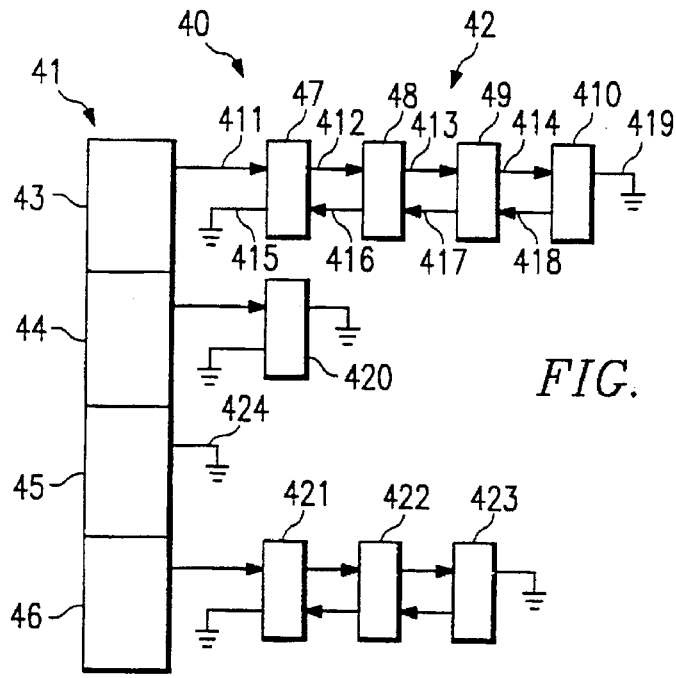
FIG. 4 is a diagram of the preferred embodiment of a modified cache buffer list.

Referring to FIG. 4, a preferred data structure embodiment of a modified cache buffer list 40 is shown. Modified cache buffer list 40 preferably comprises two parts: an anchor array 41 and modified cache buffer header lists 42. Anchor array 41 consists of an array of anchors 43–46, each anchor 43–46 corresponding to a log slot 36–37 in log partition 102. Each anchor is coupled to a doubly-linked modified cache buffer header list consisting of headers. For example, anchor 43 is coupled to headers 47–410. Anchor 43 and each header 47–410 are linked by forward pointers 411–414 and backward pointers 415–418. The modified cache buffer header list is then terminated by a null pointer 419. Anchor 44 points to a single header 420. Anchor 45 has a null modified cache buffer header list 424. Anchor 46 is linked to headers 421–423.

Each anchor 43-46 points to the header of a most recently accessed cache buffer logged in the corresponding slot. For example, the first header 47 in the list pointed to by anchor 43 is of a most recently accessed cache buffer, the data modification in which is logged in the log slot 36 corresponding to anchor 43. Therefore, headers 47-410, for example, are arranged from the most recently used to the least recently used.

Each header in modified cache buffer list 40 additionally contains two flags: a DON'T_WRITE_YET flag and a MODIFIED flag. The DON'T_WRITE_YET flag is implemented for logging purposes and is indicative of whether a particular block of data has been logged in log partition 102. The MODIFIED flag is used conventionally in a buffer cache system to indicate whether a buffer in buffer cache 11 contains modified data which needs to be written to disk 14. Details of their uses are discussed below.

Figure 5:
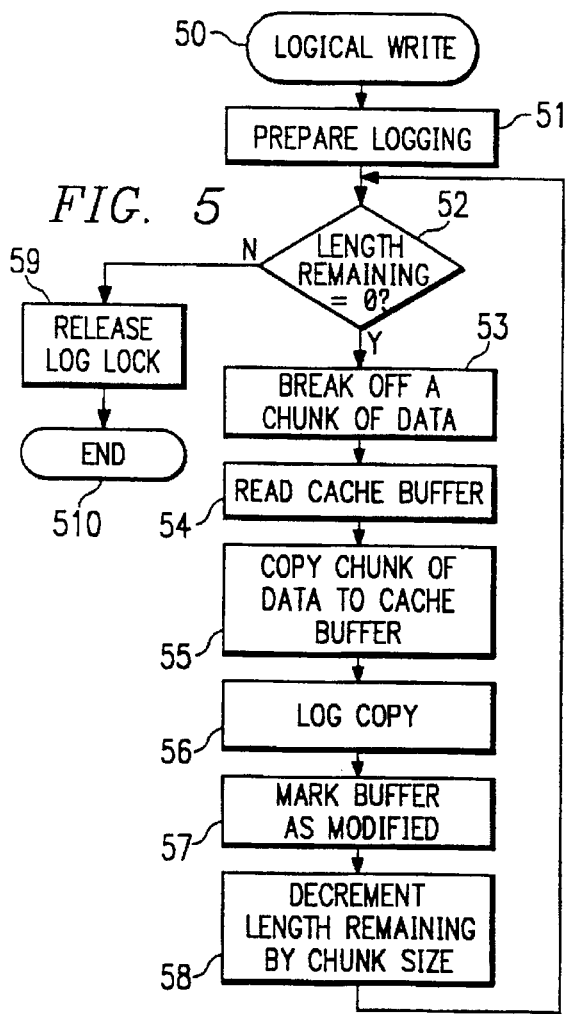
FIG. 5 is a flowchart of the LOGICAL WRITE function implemented in accordance with the preferred embodiment of the present invention.

In FIGS. 5-10, the preferred embodiment of the algorithms of the present invention are presented. Referring to FIG. 5, a flowchart of a LOGICAL WRITE function 50, which transfers a file consisting of a predetermined number of blocks of data to disk 14, is shown. LOGICAL WRITE function 50 may be a conventional file transfer function which has been modified to include disk file system logging. LOGICAL WRITE function 50 begins by preparing to log the file transfer, as shown in block 51.

Figure 6:
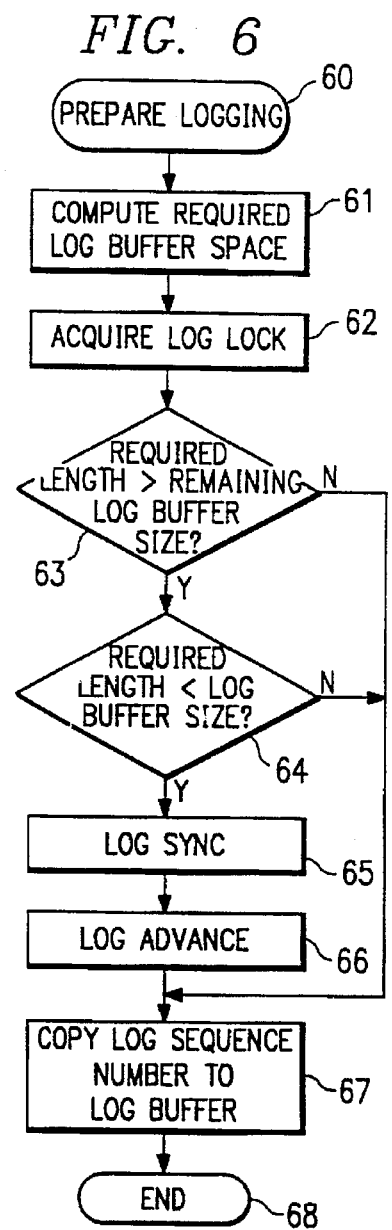
FIG. 6 is a flowchart of the PREPARE LOGGING function of the referred embodiment of the present invention.

Referring to FIG. 6, the logging preparation process is shown in more detail. PREPARE LOGGING function 60 begins by computing the amount of length required to log the file transfer as shown in block 61. Subsequently, a log lock (not shown) is acquired, as shown in block 62. The log lock is used to control writing to files which are subject to logging and ensures that only one log entry, consisting of the transfer of at least one block of data, is added at one time to log buffer 101. In block 63, the amount of space or length required to log the file transfer or the logical write transaction is compared with the amount of space available in log buffer 101. The required length is computed by:

REQUIRED_LENGTH=FILE_LENGTH+LOG_OVERHEAD_LENGTH, where FILE_LENGTH is the length of this logical write transaction in blocks, and LOG_OVERHEAD LENGTH is the amount of space required to record additional information about the logical write transaction. The additional logging information has been described in detail above in conjunction with FIG. 3. If REQUIRED_LENGTH is greater than the amount of available space in log buffer 101, then REQUIRED_LENGTH is compared with the entire length of log buffer 101, as shown in block 64. If the comparison in block 64 determined that REQUIRED_LENGTH is less than the log buffer size, then LOG SYNC and LOG ADVANCE functions are called to make room in log buffer 101 for data in the file to be written, as shown in blocks 65 and 66. If REQUIRED_LENGTH is not greater than the remaining log buffer space or not less than the total size of log buffer 101, then PREPARE LOGGING function 60 simply proceeds to block 67 where the log sequence number is copied from the counter generating the numbers to log buffer 101. Execution then terminates in block 68.

Subsequently, in block 52 of LOGICAL WRITE function 50 (FIG. 5), the remaining length of the data to be written is checked. If the remaining length of data is greater than zero, then a chunk of data of the size of a block or less is demarcated, as shown in block 53.

Some background information on how a disk file system 13 is structured would be instructional to the present discussion. Typically in a disk file system 13, each disk 14 is divided into blocks of equal size which are numbered for identification purposes. This is the disk relative block number. Additionally, groups of contiguous blocks are called partitions. Each partition is identified by a partition code, and each block within a partition is identified by a partition relative block number. Furthermore, each file stored on a disk 14 is assigned a file code for identification, and each block within a file has a file relative block number. There are existing software in the art which are capable of converting between the various identification numbers. Therefore, given a file code, it can be converted to a partition code, to a file relative block number, to a partition relative block number, etc. and vice versa. Therefore, in block 54 buffer cache 11 is searched for the appropriate buffer to store the block of data as specified by the file code and the file relative block number assigned to the file to be written.

Figure 7:
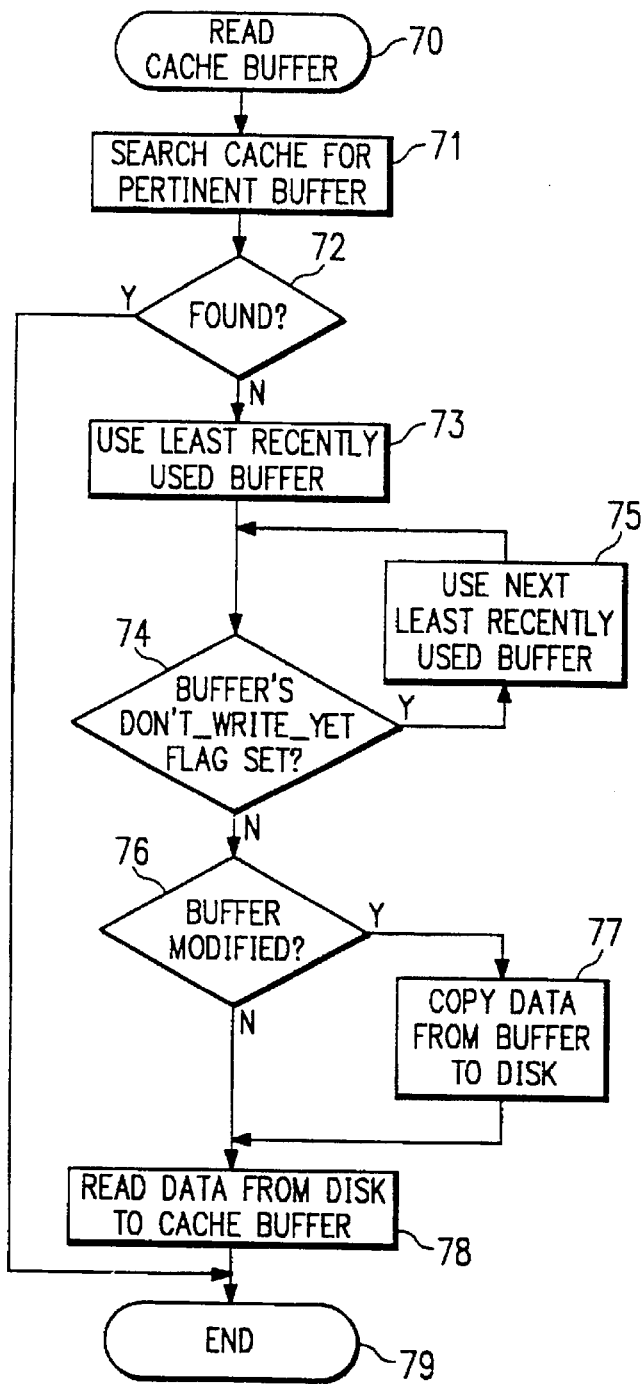
FIG. 7 is a flowchart of the READ CACHE BUFFER function of the preferred embodiment of the present invention.

Referring to FIG. 7, a READ CACHE BUFFER function 70 begins by searching the cache for a buffer with the partition code and partition relative block number that was converted from the file code and file relative block number, as shown in block 71. Such cache buffer exists if the block being written was recently used. If such buffer is not found, as determined in block 72, then the buffer containing the least recently used block of data is selected, as shown in block 73. The software which maintains the ordering of most and least recently used buffers is known in the art and therefore is not described in detail herein. The header of the least recently used buffer is examined to determine whether its DON'T_WRITE_YET flag is set, as shown in block 74. If it is not set, then the buffer may be used. However, if the DON'T_WRITE_YET flag is set, the next buffer containing least recently used data is selected, as shown in block 75. This procedure is repeated until a buffer which does not have its DON'T_WRITE_YET flag set is selected.

Proceeding to block 76, a MODIFIED flag of the selected cache buffer is examined to determine whether it contains a block of data that has not been written to disk 14 yet. If the selected cache buffer contains data that needs to be written to the appropriate file on disk 14, this is done in block 77. It can be seen that this step is the delayed write of the buffer cache scheme, where the data in cache buffer 11 is not written to disk 14 until it is flushed on a least recently used basis. In block 78, or after writing data to disk (block 77), then the contents of the block having the partition code and partition relative block number on disk is copied to the selected least recently used cache buffer. The function ends by returning the selected cache buffer's location in block 79. READ CACHE BUFFER function 70 as shown in FIG. 7 is conventional except for the modifications required to accomplish disk file system logging. The modification includes steps shown in blocks 74 and 75.

Proceeding to block 55 in FIG. 5, the demarcated block of file data is copied to cache buffer, the location of which was returned by READ CACHE BUFFER function 70. Subsequently in block 56, the writing of the data to the buffer cache 11 is logged, which is performed by the function shown in FIG. 8.

Figure 8:
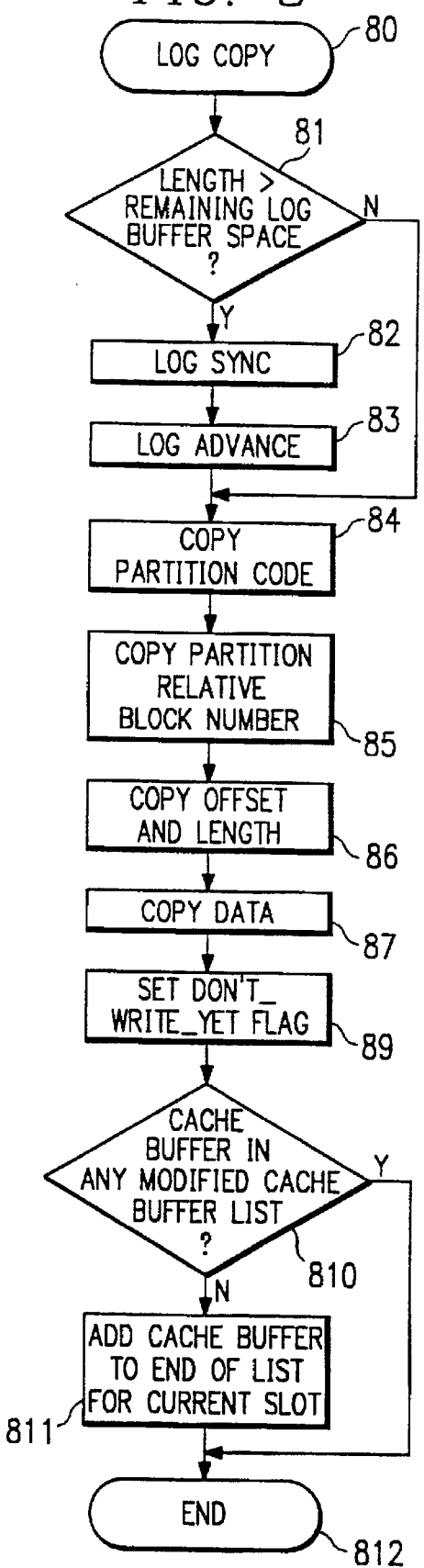
FIG. 8 is a flowchart of the LOG COPY function of the preferred embodiment of the present invention.

Referring to FIG. 8, a LOG COPY function 80 is shown. In block 81, the length of the block is compared with the amount of space remaining available in log buffer 101. Note that the length of data will be less than a full block long. If log buffer 101 does not have sufficient space to accommodate the block of data, then LOG SYNC and LOG ADVANCE functions are called, as shown in blocks 82 and 83. The details of LOG SYNC and LOG ADVANCE functions are discussed below in conjunction with FIGS. 9 and 10. Assuming log buffer 101 has sufficient space available for the current block of data, the logging process begins. In block 84 the partition code of the block of data is first copied from buffer cache 11 to log buffer 101. Then the partition relative block number, the block offset and length are copied also to log buffer 101, as shown in blocks 85 and 86, respectively. Subsequently in block 87 the data in the current block is copied. The DON'T_WRITE_YET flag of the cache buffer from which data is being copied to log buffer 101 is then set, as shown in block 89. A determination is then made in block 810 as to whether the cache buffer is already represented in modified cache buffer list 40. If the cache buffer is not already in modified cache buffer list 40, then the header of the present cache buffer is added to the end of modified cache list buffer header for the current slot. It is to be noted that conceptually modified cache buffer header list is composed of the headers of each cache buffer, however in implementation, the list may be linked by dedicated forward and backward pointers between anchors 41 and cache buffers, and between the cache buffers in each modified cache buffer header list. LOG COPY function 80 ends in block 812.

Returning to LOGICAL WRITE function 50 in FIG. 5, the MODIFIED flag of the cache buffer to which data was copied from user area is set to indicate that the buffer contains modified data that is not stored in disk 14. The amount of length remaining in the file to be written is decremented, as shown in block 58. Execution then loops back to block 52 to continuously write the file contents block by block to buffer cache 11 and to log the data. When length remaining is determined to equal to zero in block 52, the log lock is released, as shown in block 59, and execution ends in block 510.

Referring to FIG. 9, LOG SYNC function 90 begins by copying the log sequence number to log buffer 101, as shown in block 91. Subsequently, the contents of log buffer 101 are written into the current slot in log partition 102, as shown in block 91. Because log partition 102 has more than one slot, the slots are used one after the other in a circular fashion and a marker is used to indicate the current slot in use. Effectively, log buffer 101 is emptied into log partition 102 to make room for logging the present file transfer. In blocks 92–94, the modified cache buffer header list (shown in FIG. 4) pointed to by the corresponding anchor of the current slot is examined. More specifically, each header in the corresponding modified cache buffer header list is examined and its DON'T_WRITE_YET flag reset. For example, if the current slot is the last slot 37 in log partition 102, then modified cache buffer header list comprising headers 421–423, which are pointed to by anchor 46, corresponds to the current slot. Using this example, a determination is first made as to whether the end of the list is reached, as shown in block 92. If not, the DON'T_WRITE_YET flag of the header that is currently being examined is reset. Subsequently in block 94, the next header is examined in turn. Therefore, blocks 92–94 traverses the modified cache buffer header list of the current slot to reset the DON'T_WRITE_YET flag of each header, until the end of the list is reached, as determined in block 92. Once the end of the list is reached, LOG SYNC ends, as shown in block 95. Effectively, the resetting of the DON'T_WRITE_YET flags in those headers indicates that the contents of those cache buffers corresponding to the headers have been logged in log partition 102 on disk 14 and therefore the associated buffers may be reused.

Subsequently in PREPARE LOGGING function 60, a LOG ADVANCE function is called in block 46. Referring to FIG. 10, LOG ADVANCE function begins in block 1000. In block 1001, a determination is made as to whether the current slot in log partition 102 is the last slot. As shown in FIG. 2, slot 37 is the last slot of log partition 102. If the current slot is not last slot 37, then an advance is made down the buffer to the next slot position, as shown in block 1002. If the current slot is last slot 37 of log partition 102, then the current slot is set to be the first slot in log partition, or slot 36 in FIG. 3, as shown in block 1003. This effectively makes log partition 102 a circular buffer. It is easily seen that the implementation of traversing log partition 102 or any other data structure in the present invention is dependent upon the actual implementation of the data structure as known in the art.

Using the structure in FIG. 3 as an example, if at the beginning of LOG ADVANCE 1000 the current slot is slot 36, then the current slot marker would be advanced to the next slot in block 1002. At this point, since a new current slot (the next slot) will be used for logging, its corresponding cache buffers, if any, may contain data that has not been written to disk 14. If so, the data in the cache buffers are written to disk 14. This is done in blocks 1004 to 1006. In block 1004, the corresponding modified cache buffer header list for slot 25 is examined. If the end of the list is not reached, then execution proceeds to block 1005, where the contents of the corresponding cache buffer of the current header is written to disk 14. The current cache buffer header is then removed from the modified cache buffer header list, as shown in block 1006. The procedure in blocks 1005 and 1006 is repeated until the end of the modified cache buffer header list is reached for the current slot, as determined in block 1004. The function then terminates in block 1007.

FIGS. 11 and 12 show the preferred logic flow of LOG POST and POST ALL ENTRIES functions which are performed after an abnormal shutdown. The main purpose of these functions is to restore file system data to the state prior to the shutdown failure. This is done by copying the data logged in log partition 102 to buffer cache 11 in the same sequence as the data changes were effected prior to the system failure. LOG POST and POST ALL ENTRIES functions are executed immediately upon power up after a system crash.

Referring to FIG. 11, LOG POST function 1100 begins by disabling all logging operations, as shown in block 1101. The contents of log partition header 31 are then obtained (block 1102), and each log partition, as recorded in log partition table in header 31, are opened, as shown in block 1103. In addition, the number of logged partitions are counted. If there is at least one logged partition (the number of logged partitions is greater than zero), as determined in block 1104, then the first slot of that logged partition is located in block 1105. The first slot may be found by searching circular buffer 32 of log partition 102 from the beginning and looking for the slot having the lowest log sequence number. Since log partition is a circular buffer, this step is necessary to determine the true sequence of data changes to disk file system 13. If the first slot is found (block 1106), then POST ALL ENTRIES function, shown in FIG. 12, is called.

Referring to FIG. 12, POST ALL ENTRIES function 1200 begins by setting current slot to equal to the first slot found, as shown in block 1201, and current sequence number to equal to the log sequence number of the first slot, as shown in block 1202. In block 1203, the current entry is also set equal to the first entry in the first slot. Subsequently in block 1204, the log partition table (not shown) in log header 31 is searched for the partition code of the current log entry. If it is found, as shown in block 1205, it indicates that the logged partition is one which was still open when the system crashed. The log entry's log sequence number as recorded in log partition table is then compared with the value of the current sequence number, as shown in block 1206. The log sequence number as recorded in log partition table being less than the current log sequence number would indicate that the slot was logged after it was opened and before it was closed. If so, the contents of logged data for that entry is copied or posted to buffer cache 11 at the correct offset, as shown in block 1207. The cache buffer receiving the data is subsequently marked as modified, as shown in block 1208. The current entry is advanced to the next entry in the current slot in block 1209. If in doing so the end of the current slot is not reached then code execution returns to block 1204. In this manner, each entry in the current slot that should be posted is copied to buffer cache 11 until the end of the slot is reached, as determined in block 1210. If the end of the current slot is reached, then the current slot is advanced to the next slot, as shown in block 1211. A determination is made in block 1212 to ensure all slots in log partition 102 have been examined and posted, if necessary. If not all the slots have been examined, execution returns to block 1202 to operate on the next slot.

Returning to LOG POST function 1100 in FIG. 11, all necessary posting has been performed and disk file system logging system 10 must be readied for logging again. In block 1108, all partitions are closed and the log partition table is cleared. Log partition 102 is initialized or cleared, as shown in block 1109. Finally, logging is enabled in block 1110, and the system is once again ready to proceed to log all logical write transactions.

From the foregoing, the preferred embodiment of the present invention ensures the integrity of the disk file system while preserving the advantages of using a disk buffer cache. In event of an abnormal breakdown, log partition 102 will contain enough information to restore the disk file system. Although the present invention has been described in detail, it should be understood that various changes, substitutions and alterations can be made thereto without departing from the spirit and scope of the present invention as defined by the appended claims.

What is claimed is:

1. A method for logging a plurality of transactions performed on a file system stored in a mass storage device of a computer system, said computer system utilizing a buffer cache for storing transaction entries, each of said transaction entries comprises a header with a Don't_Write_Yet flag and a modified flag, the method comprising the steps of:

accessing said buffer cache for performing a transaction of one of said transactions;

logging said transaction entry in a log buffer of said computer system;

setting said Don't_Write_Yet flag and said modified flag of said transaction entry in said buffer cache for indicating the existence of said logged entry in the log buffer thereby preventing the overwriting of said transaction entry in said buffer cache;

copying said log buffer entry to said log partition on said mass storage device; and resetting said Don't_Write_Yet flag and said modified flag of all corresponding cache buffers.

2. The method, as set forth in claim 1, wherein said logging step comprises the step of recording alterations made to said buffer cache in an additional log buffer residing on a primary storage device of said computer system.

3. The method, as set forth in claim 1, wherein said accessing step further comprises the steps of:

preparing for said logging step;

searching said buffer cache for an appropriate cache buffer including new or altered data generated by said transaction; and copying said new or altered data to said appropriate cache buffer.

4. The method, as set forth in claim 3, wherein said preparing step further comprises the steps of:

computing an amount of space required to log said transaction;

comparing said computed amount with an additional amount of space remaining in said log buffer;

copying said log buffer to said log partition in response to said computed amount being greater than said additional amount; and copying a corresponding cache buffer to said mass storage device in response to said computed amount being greater than said additional amount.

5. The method, as set forth in claim 3, wherein said searching step further comprises the steps of:

locating an additional cache buffer having a predetermined code;

locating a least recently used cache buffer in response to not finding said additional cache buffer having said predetermined code;

determining whether said least recently used cache buffer includes data not yet written from said log buffer to said log partition; and locating a next recently used cache buffer in response to said least recently used cache buffer and combining data not yet copied from said log buffer to said log partition.

6. The method, as set forth in claim 5, wherein said searching step further comprises the steps of:

determining whether said next recently used cache buffer includes data not yet written to said mass storage device;

copying data therein to said mass storage device in response to said least recently used cache buffer including data not yet written; and reading data located at a predetermined location on said mass storage device to said least recently used cache buffer.

7. The method, as set forth in claim 4, wherein said preparing step further comprises the step of comparing said computed amount with a size of said log buffer.

8. The method, as set forth in claim 4, wherein said copying step further comprises the steps of:

comparing said computed amount of space required to log said transaction with said additional amount of space remaining in said log buffer;

copying said log buffer to said log partition in response to said computed amount being greater than said additional amount of remaining space;

copying said corresponding cache buffer to said mass storage device in response to said computed amount being greater than said additional amount;

copying logging information from said buffer cache to said log buffer;

copying data from said cache buffer to said log buffer;

marking said cache buffer as not yet written; and adding said cache buffer to a modified buffer list.

9. The method, as set forth in claim 8, wherein said logging information copying step comprises the steps of:

copying a partition code corresponding to said data in said cache buffer;

copying a partition relative block number; and copying an offset and length of said data.

10. The method, as set forth in claim 1, further comprising the step of copying said log partition to said buffer cache after an abnormal system shutdown.

11. The method, as set forth in claim 10, wherein said copying step further comprises the steps of:

determining a sequence of said transactions being copied to said log partition; and copying said log partition to said buffer cache in the same sequence as said transactions are copied to said log partition.

12. The method, as set forth in claim 11, wherein said copying step further comprises the steps of:

determining open log partitions open at a time of said abnormal system shutdown; and copying said transactions associated with said open log partitions open at the time of said abnormal system shutdown.

13. The method, as set forth in claim 10, further comprising the step of reinitializing said log partition after said copying step for subsequent logging.

* * * * *